May 30, 1961  D. E. BABCOCK ET AL  2,986,460
PRODUCTION OF IRON
Filed Feb. 19, 1958  2 Sheets-Sheet 1

Inventors
Donald E. Babcock
Ralph M. Drews
Sheridan R. Crooks
By William H. Woodlief
Attorney May 30, 1961 D. E. BABCOCK ET AL 2,986,460
PRODUCTION OF IRON
Filed Feb. 19, 1958 2 Sheets-Sheet 2

Inventors
Donald E. Babcock
Ralph M. Drews
Sheridan R. Crooks
By William H. Woodlief
Attorney

United States Patent Office 2,986,460
Patented May 30, 1961

2,986,460
PRODUCTION OF IRON

Donald E. Babcock, Youngstown, and Ralph M. Drews and Sheridan R. Crooks, Cleveland, Ohio, assignors, by mesne assignments, to R-N Corporation, New York, N.Y., a corporation of Delaware Filed Feb. 19, 1958, Ser. No. 716,125

2 Claims. (Cl. 74—44)

This invention relates to the production of iron by reducing iron ore with material comprising a carbonaceous reducing agent, under conditions such that the iron product of the reducing operation is substantially unmelted but is delivered in a highly heated condition. Procedure of this type is sometimes defined as a direct-reduction process, i.e. converting a high percentage of the chemically combined iron of the ore, e.g. iron oxide material (the term ore here including both natural ores and other oxide material such as mill scale), to metallic or elemental iron without smelting. A solid product is thus delivered from the reducing zone, e.g. a product capable of yielding, upon further grinding and concentrating operations as necessary, a finely divided material that consists, in at least a high proportion, of metallic iron.

A particularly effective direct-reduction process involves supplying successive quantities of iron ore, with a solid carbonaceous reducing agent such as coke, char or anthracite coal, to an appropriate kiln where the reduction is effected at elevated temperatures which may reach 2100° F. or thereabout. A solid product, in lumps, fragments, granules or other divided form, that represents a substantial metallization of the ore, is delivered from the kiln at a high temperature, usually upwards of about 1700° F. By further procedure as necessary or desired, the reduced ore subsequently yields or becomes a final product material consisting essentially of very finely divided metallic iron, with no more than a small proportion of other material such as unreduced oxide, gangue, uncombined carbon or the like.

For many purposes it is important that the ultimate iron product or concentrate be briquetted for ease of handling and of subsequent processing or use, i.e. by compacting discrete quantities of the ultimate iron material into briquettes. It will be understood that references herein to briquetting and to the produced briquettes, refer to an operation where coherent bodies of the iron material, either in the usual shapes of briquettes or in other bar, block, cake, pellet or similar form, are produced by pressure, i.e. by strongly compressing or compacting the powdered or otherwise finely divided iron material into such shape, very preferably without binder or adhesive. That is to say, it is highly desirable to briquette the iron material by compacting it under high pressure so that the iron particles are caused to cohere, yielding briquettes of sufficient strength for handling, transportation and subsequent use, e.g. as charge for open hearth, electric, cupola, blast or other furnaces from which melted iron or steel is to be withdrawn.

While under some conditions the reduced iron material from the kiln is found to yield a product which can be readily briquetted, it has now been found that in many cases, particularly when the reducing operation is carried to more than 90% metallization of the iron ore (meaning conversion of more than 90% of the iron value of the ore to a metallic or elemental state), the particles of iron material cannot be compressed to a briquette of desirable coherence or strength. That is to say, in such cases the application of high pressure to a body of the particles does not appear to cause them to weld together in the desired manner; the formed briquettes have relatively little strength and may be easily broken or crushed.

The present improvements in the production of iron by such direct-reduction procedures are accordingly designed to avoid these difficulties in briquetting, a particular object being to afford a reduced iron product which, even at very high metallization, will be capable of being compacted under pressure to form readily strong briquettes, a further object being to provide procedure and apparatus whereby in the continuing operation of reducing iron ore, a product is consistently attained which, regardless of high metallization all or part of the time, has desirable briquetting properties.

In attaining these and other objects, the invention is predicated on the finding that under certain and indeed often preferred reducing conditions, the metallic iron material, e.g. as subjected to grinding and other treatment following the actual reduction, contains a substantial percentage of combined carbon, the term combined carbon being here used, unless otherwise stated, to mean carbon combined in the microscopic structure of the iron, whether in so-called solution in the iron or as carbide or the like, all in distinction from uncombined carbon, meaning carbon particles or pieces which either in adherence to the reduced ore or otherwise, may commonly appear in the kiln product. Indeed as explained below, tests have indicated that the combined carbon content of the reduced iron bears a relation to the percentage of metallization of the ore, i.e. increasing with the latter.

It may be noted, at this point, that high metallization is in many cases very desirable, especially in the procedures where the kiln product must be subjected to considerable concentrating operation to separate the metallic iron values from gangue, unreduced material, excess (uncombined) carbon and the like. Thus high metallization minimizes iron losses in the concentrating circuit, since smaller amounts of incompletely reduced iron are then present to be rejected and lost, for example as non-magnetic matter where magnetic concentration is employed. Alternatively, within any given limitations of concentrating operations, high metallizations of ore tend to yield ultimate concentrations of greater purity as to iron content. Basically, too, higher metallizations represent greater recovery of iron values from the ore. Furthermore, it is considered that with higher metallization, the greater carbon content of the iron, as combined carbon contributes an improvement in utility, in that the correspondingly higher content of total carbon (being the sum of free and combined carbon) appears to provide improved melting properties in the ultimate concentrate or product. It is believed, for example, that the carbon content then compensates to a more substantial degree for the presence of residual oxides of iron in the material. For these or other reasons it is found, for example, that a product directly suitable for use in making steel, e.g. as part of the charge to an open hearth or electric furnace, or indeed for use in other melting furnaces, may be much more readily obtained with high metallization than by direct-reduction procedure yielding a lower percentage of metallization.

As explained, the reduction processes here contemplated involve the treatment of the iron ore with coke or other carbonaceous material at elevated temperature insufficient to melt or appreciably sinter the material, the kiln product benig thereafter subjected to concentrating operations, including preferably both magnetic and gravity separating stages with the material in wet state, to reach the ultimate iron concentrate. In such prior operations the hot product of the kiln was quenched, i.e. by delivering it directly and before it was exposed to air, into a body of water whereby it was brought substantially or almost instantaneously from a high temperature, often 1900° F. to 2100° F., down to a low temperature, usually substantially below 200° F., where it could be handled in the atmosphere with very little tendency toward oxidation, and no tendency toward pyrophorism, of the metallic iron content. This quenching operation is highly desirable, in that it is not only an economical mode of cooling the kiln product, and is compatible with the subsequent wet (aqueous) grinding and concentrating stages, but is usually very effective in stabilizing the material, i.e. in getting it down to a substantially non-oxidizable condition, and in providing assurance that such condition is consistently reached. Moreover, the water quench provides an effective seal for the high temperature system, in that the heated material is delivered only under water and cannot avoid reaching a safe temperature before it makes contact with the air.

It has now been discovered that the poor briquetting properties of the iron products having high metallization, and especially of those having a substantial content of combined carbon as explained below, can be corrected or avoided by procedure including a special or modified cooling operation in converting the kiln product to a condition where it can be exposed for processing. Specifically, it is found that by cooling the material from the kiln in a substantially slower manner than the described quenching, until a temperature below 1200° F. is reached, and preferably a temperature of about 1150° F. or less, followed by a second stage of cooling which very advantageously consists in a quenching operation, the ultimate, metallic iron product has excellent briquetting properties, even though it may represent high metallization and may have a relatively substantial content of combined carbon.

According to present understanding, the prior quench cooling of the kiln discharge from its high temperature to the final, desired value, resulted, in the case of material containing more than about 0.1 to 0.15% combined carbon (in most cases, above the point of 0.12% carbon), in the production of a martensitic structure in the iron. Significant amounts of martensite are thus found when the carbon content is above the limit mentioned, and the condition is severe for combined carbon content, in the iron, of more than 0.2%, i.e. in that the material approaches a substantially completely martensitic character. The martensitic form of iron is extremely hard and brittle, and the difficulty in briquetting is thus understood to be attributable to the martensitic structure which keeps the iron particles from having the desired capability of yielding and at least incipiently welding together under briquetting pressure.

However, by controlling the cooling operation, especially by retarding it through a predetermined range, and at least in a range which extends from substantially above 1200° F. to a value lower than such point, the appearance of martensite can be avoided in the ultimate cooled material. That is to say, with slow cooling the carbon-containing iron assumes a form which is different from martensite and which, lacking the hard, brittle and unyielding properties of the latter, is susceptible of the desired coherence of its particles under pressure, in briquetting. It appears that in many cases the material thus produced by the present process is pearlite or of pearlitic structure in substantial part. Alternatively, it is understood that in at least some cases of the present procedure, the metal may finally appear in other forms than true pearlite, such as so-called divorced pearlite (sometimes described as a spheroidal structure). In the last-mentioned case, the effect of the described selection of cooling rates can apparently be said to produce a partial or complete divorcement of pearlite into ferrite, with the usual precipitation of its cementite ($Fe_3C$) counterpart as spheroids within the ferrite grain. In any case, it would appear that if the procedure is such as to avoid the production of martensite or to convert it to some other form, the requirement of good briquetting properties will be satisfied, whether the actual structure is pearlite or something else, even up to combined carbon contents of as much as 1.0% or so. Indeed in a more general sense it will be appreciated that the invention is not limited to any particular theory of metal structure, in that the practice of the special cooling stage or stages herein described has been conclusively found to effectuate the desired improvement in the briquetting property of kiln products having combined carbon above the limits mentioned. The described results are achieved regardless of any understanding as to the presence of the structure known as martensite (which has been described as a solid solution of carbon in tetragonal ferrite), although extensive tests have tended to indicate that martensite invariably appears where such material is quench cooled from the kiln temperature to the desired end point.

A special feature of the invention involves a plural-stage cooling operation, most advantageously an operation where the kiln product, in a first stage, is cooled relatively slowly in an enclosed drum or the like, under non-oxidizing conditions, until it reaches a temperature below 1200° F., and more particularly, with special advantage, below about 1170° F. In the second and final stage the material is quench cooled, i.e. by delivering the partially cooled product into contact with a cooling medium, e.g. oil, gases, water or the like, without exposing it to the air. In this further step the material can be brought to a temperature below 300° F. and very preferably well below 200° F. so that it can thereafter be exposed to the air with relatively little or no appreciable tendency toward reoxidation. With this two-stage procedure, substantial advantages of the quenching operation, as described above, are retained, including its ease of control, and its economy, as well as its certainty of function, while at the same time the difficulties in ultimate briquetting of the iron are obviated without undue complexity or inconvenience with respect to additional equipment and processing.

Further features of the invention, as well as alternate or other modes of procedure may be explained in connection with the accompanying drawings, wherein.

Figures 1, 2:
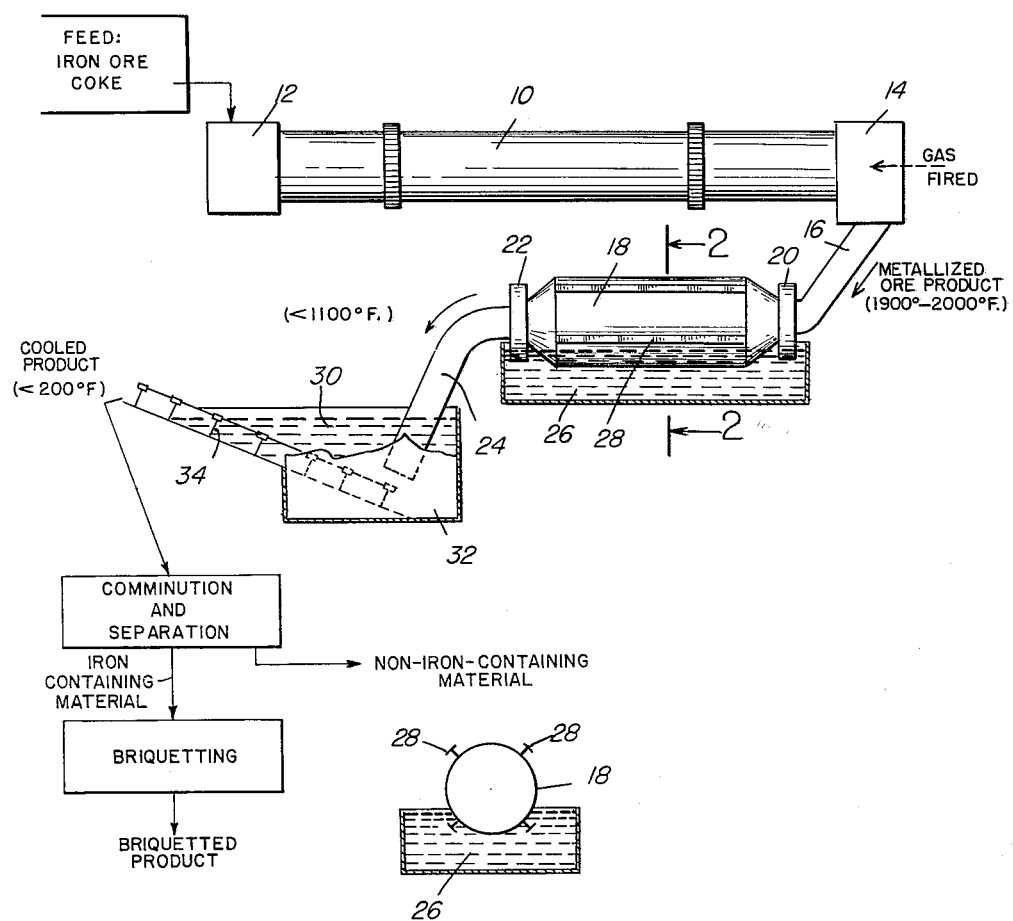
Fig. 1 is a diagrammatic view of a reducing and cooling system for carrying out the invention.
Fig. 2 is a schematic cross-sectional view, on line 2—2 of Fig. 1, of the rotary cooler indicated as part of the apparatus of Fig. 1.

While the improved procedure is capable of performance in apparatus of other types, Fig. 1 illustrates certain essential features of a particularly effective system. Thus the reducing operation is effected in a long rotary kiln 10, which may have a length of 150 feet and an internal diameter between 6 and 7 feet, with an appropriate lining of refractory and thermal insulating material. The feed to the kiln is introduced continuously through an appropriate inlet chamber 12 and may comprise iron ore, coke and if desired, some limestone, as for fluxing out the sulfur in the coke, the materials being crushed to appropriate size, conveniently lumps or fragments having dimensions of one inch or less. Other sizes of the materials may be used, including fine or granular particles or pelletized fine material. The feed advances along the kiln, by its gradual slope, toward the discharge and combustion chamber 14, while the kiln rotates at an appropriate speed, e.g. about 3 to 5 minutes per revolution (m.p.r.). The kiln is fired countercurrently to the path of the material under treatment, as by appropriate flame directed into the kiln from the combustion chamber, supplied with suitable fuel such as natural gas, oil, powdered coal or the like, the air supply for combustion being adjusted to achieve the desired conditions of temperature and gas characteristics, for example as to carbon monoxide gas in the kiln.

With appropriate control of the kiln operations, a relatively high percentage of the iron oxide in the ore is reduced to metallic iron, the continuous discharge thus representing a highly metallized ore, which also usually includes, however, considerable siliceous or other gangue material and which is usually accompanied by excess coke. The kiln discharge according to the present invention travels continuously through a suitably closed chute or conduit 16 to a rotary cooler 18, which may be essentially a large rotated steel drum, with frusto-conical end portions and appropriate air-tight sealing structure at the end openings, i.e. the seal 20 between the chute 16 and the inlet end of the cooler, and the seal 22 between the outlet end and the discharge chute 24. Here the lumps or other pieces or particles of reduced ore, and accompanying material, are brought down to a temperature preferably at least below about 1170° F., by conductive heat exchange through the cooler shell or other means substantially slower in function than direct quenching, i.e. than by sudden contact of the hot material with a large body of relatively cool fluid. Although other means of extraction of heat from the cooler may be employed, the drawing (Figs. 1 and 2) shows the lower part of the cooler 18 immersed in a water bath 26, while the cooler is rotated, say at 1.5 r.p.m., and the water is kept at appropriate temperature as by circulation to a cooling tower (not shown) or in any conventional manner. To facilitate the operation, the drum 18 may have a plurality of flanges extending parallel to the axis thereof and on its outer surface, such as the T-shaped members 28, which tend to pick up some of the water and keep it washing over the entire outer surface of the drum. The drum may also have helical flights (not shown) on its inner surface, to aid the advance of the material.

The partially cooled material, say at a temperature of 1000° to 900° F., or even lower if desired, is discharged continuously through the outlet chute or conduit 24 which opens beneath the surface of a relatively large body of water 30 in the quench tank 32. This water, again kept at appropriately low temperature by recirculation to a cooling tower (not shown) or otherwise, essentially instantaneously brings the kiln-discharged material to a relatively low temperature, such that it may thereafter be exposed to the atmosphere without danger of rapid reoxidation of the reduced iron. For example, the quenching operation may be controlled to bring the temperature of the material down to about 100° F., or at least below about 200° F. in ordinary circumstances, the supply of water to the tank being conveniently adjusted or controlled to have a relatively small temperature rise because of the quenching operation, e.g. from 70° F. inlet to 90° F. outlet for the water. Continuously or otherwise as desired, the material is withdrawn from the quench tank, for instance by suitable mechanical means such as a rake drag indicated at 34.

The cooled product, which contains metallic iron, usually some residual iron oxide, excess coke and other materials, ordinarily including considerable gangue from the ore, is then appropriately processed for ultimate recovery of a final product consisting chiefly of metallic iron. Various grinding, concentrating and separating operations may be employed for such purpose, illustration of same being omitted for simplicity. For example, where the material includes a considerable content of large lumps or fragments, it may be ground in a ball mill and then subjected to successive magnetic separations, wet gravity concentration stages, as with Wilfley tables or other suitable means, and including screening, thickening, de-watering or other stages as desired. As a result of such further treatment, a final concentrate is derived, or set of concentrate fractions, which consist of more or less finely divided solid material with a high content, e.g. up to about 97% of metallic iron, the reminder being small quantities of iron oxide, carbon (including combined carbon and sometimes free carbon), and in some instances a very small amount of silicate-type or other gangue. The object, of course, is that this final product approach as closely as possible to a composition which is entirely metallic iron, e.g. except for combined carbon and the like.

It is usually desired that the final, pulverized product be converted to relatively large, dense pieces, by briquetting or equivalent treatment under pressure. Thus the material, after drying as in a suitable rotary drier, is conveyed to a briquetting press, where under hydraulic pressure of, say, 35 tons per square inch or more, briquettes are fashioned, for instance, as to contain from 5 to 50 pounds, or more, of iron apiece. Small pellets or briquettes, however, may also be made, for use in some furnace operations.

With the described procedure, including the plural-stage cooling operation, it is found that the reducing step may be regulated to achieve as high a metallization of the ore as can be economically obtained, yet despite the appearance, continuously or during parts of the time, of a substantial content of combined carbon (e.g. above 0.12% and usually considerably more) in the iron fraction of the kiln-discharge, effective briquetting is consistently obtained. The cooled iron material is sufficiently soft, i.e. being understood to be essentially entirely free of martensite, as to be capable of forming coherent briquettes which are of desired strength and can be handled for their intended use without serious breakage.

As noted, the reduction of the ore in the kiln is effected with carbonaceous material, it being understood that the invention is applicable to procedures where the reducing agent, at least in part, comprises such material, affording the source of combined carbon in the reduced iron. Although references to carbonaceous material will be understood to include gaseous agents such as carbon monoxide and hydrocarbons, the present improvements are of particular significance where a solid carbonaceous reducing agent such as coke, charcoal, anthracite or the like, is employed; with solid carbon, even though in a strict chemical sense the actual reduction may partly or wholly involve the gaseous phase of carbon monoxide, the tendency to inclusion of fine carbon in the iron is very marked, especially with the use of excess coke as appears preferable for attainment of very high metallization. While it is ordinarily preferred to regulate the kiln process so that the average metallization in the kiln-discharge is above 90% and usually well above, i.e. 93% to 95% or higher, economics and convenience of control may have to permit some variation in the state of the product such that a considerable part of the discharge may be below 90% metallization, e.g. down to 85%. In these situations, however, the present improvements are nevertheless valuable, since the ultimate fine concentrate may attain a significant percentage of high-carbon iron, or at some times may consist chiefly of such iron. In either of the latter cases, the martensitic condition, i.e. either in a fraction of the product, or during parts of the time of operation, would interfere seriously with briquetting, whereas by the present process, such difficulty is obviated.

Figure 3:
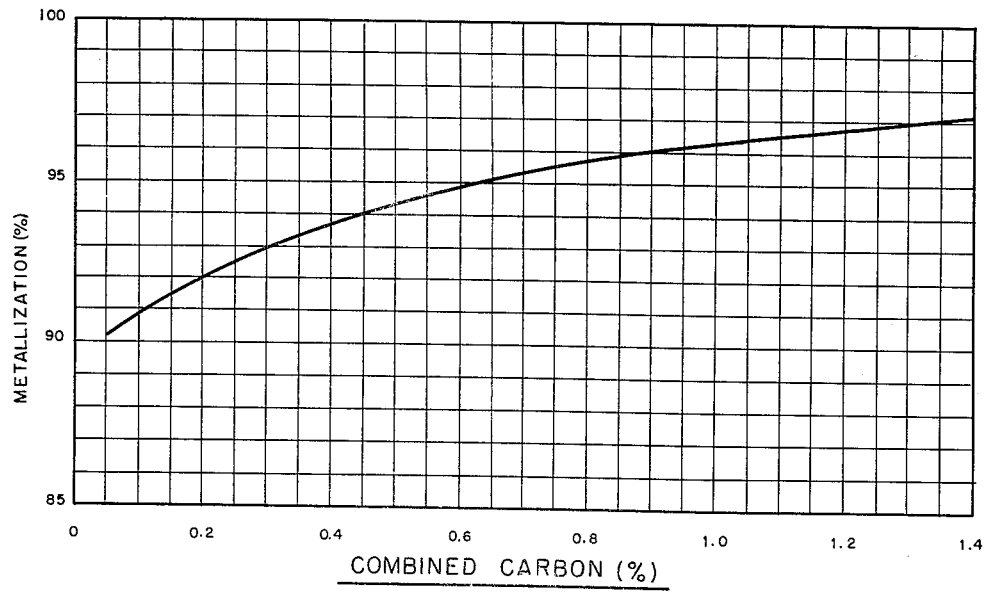
Fig. 3 is a graphical representation of the relationship between combined carbon content and metallization, as found to appear from tests of various reduction products.

Fig. 3 shows the relationship found to exist between percentage of ore metallization and combined carbon content (in the reduced iron), as determined from a number of runs with reducing operations of the type described above and utilizing iron ore of medium or even low grade, it being at present believed that such relation is generally applicable for various reducing operations of this type on various ores. As will be seen, the combined carbon content is generally not more than about 0.1% (such percentages here and elsewhere herein being measured on the reduced iron itself) where the metallization is less than 90%, meaning that less than 90% of the combined iron has been converted to metallic form. As the metallization reaches values substantially above 90%, the combined carbon rises above 0.2%, often reaching values of 0.6% to 0.8% with metallizations that are now attainable in practice. The presence of more than 0.15% combined carbon is understood to represent a critical condition for the use of the present invention, e.g. in order to obtain any effective briquetting of the final product by compression, and indeed in order to obtain desired briquetting where the material reaches such carbon concentrations only at some times or in some fractions of the ultimate product. The procedure, including special cooling to avoid martensitic structures, is nevertheless highly desirable, to get briquettes of good strength, where the combined carbon is above a value in the range of 0.1% to 0.15%, say 0.12%, or where the product may average such carbon content either continuously or at times.

Figure 4:
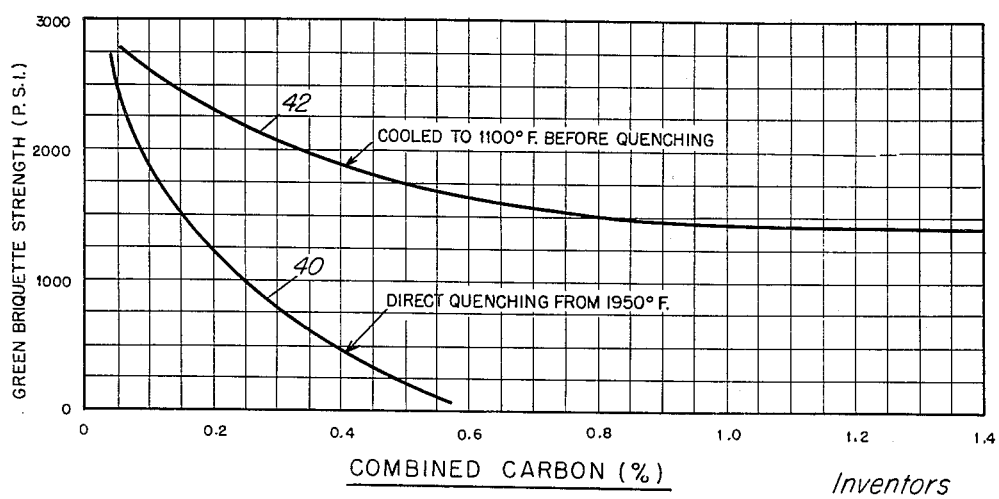
Fig. 4 is a graphical representation of relationships between briquette strength and combined carbon content, for products made according to the invention and for those made by the prior process.

Fig. 4 shows the relation found to exist in tests of iron reduced by procedures of the type described above, between briquette strength and carbon content of the reduced metallic iron. In this graph, the curve 40 represents material which upon discharge from the kiln 10 (Fig. 1) was cooled directly to the desired low, non-oxidizing temperature by the single step of quenching, i.e. essentially instantaneous cooling throughout the entire temperature drop, while curve 42 represents the product which has been cooled by the two-stage operation such as shown in Fig. 1, including relatively slow cooling to a value of 1100° F. or below, followed by a quenching stage. The carbon content is expressed in percentage of metallic iron, while the briquette strength is expressed in terms of a standard test as applied to briquettes compacted with a pressure of about 35 tons per square inch, utilizing no binder in the material. In the strength test, the briquettes are made as bars of standard dimensions, i.e. having a rectangular cross-section ½ inch wide and ¼ inch thick and a length of 1¼ inches, and are then supported horizontally at two points spaced one (1) inch apart while force is applied to a small area of the upper surface between such points. The values used for the graph, Fig. 4, are values of stress calculated from the load thus applied to the so-called fibre stress bars, at which they break in the described test. This green strength determination is made in accordance with Standard Procedure 15–51 of the Metal Powder Association, published by the latter Association as "Method for Determination of Green Strength of Compacted Metal Powder Specimens."

In general, it is desired that the briquettability of the final iron product in the present operations be such as to withstand the usual shipping, handling and storage conditions encountered in the steel industry. It is at present believed that these properties are assured, in most cases, if the iron concentrate exhibits a green strength, in the above test, of at least 1500 pounds per square inch, i.e. to lie in a region of the graph above such value for breakage of the stress bar, although in some cases it is conceived that strengths down to 1000 pounds per square inch may be satisfactory. As will be seen, the material which was cooled wholly by quenching falls short of meeting these requirements as the combined carbon content rises appreciably above 0.12%, while the product of the present process showed good briquettability, i.e. a strength of 1500 pounds per square inch or better, up to relatively high combined carbon values, even 1.0% and above.

As indicated, the material discharged from the kiln 10 has a high temperature, the reducing operation generally including temperatures in the range of 1900° F. to 2100° F. or slightly higher, especially toward the discharge end, although the iron is not melted and the temperature is very preferably controlled to avoid even appreciable sintering. In general, the discharge has a temperature of at least about 1700° F., being in all cases above 1350° F., and almost always, very substantially higher than 1400° F. As stated, a basic requirement of the present invention is that the kiln-discharge be cooled in such way, at least down to a value below about 1200° F. or at least in dropping from 1350° F. to a point below 1200° F., as to avoid appearance of appreciable martensite in the cooled product, it being observed that if the cooling is appropriately controlled down to, say, 1170° F. or preferably somewhat lower, the carbon-content iron is stabilized in non-martensitic form, and may thereafter be brought to the ultimate low temperature by quenching.

In general, it appears that if the operation in the rotary cooler is such as to bring the temperature of the material down to about 1150° F. at a practical rate of 300° F. per minute or slower, highly satisfactory results are obtained. Alternatively, it is conceived that even though a very rapid cooling may be used to reduce the kiln product to about 1350° F., a slow cooling to say 1170° F. or 1150° F. is significant in providing the desired ultimate briquettability (with absence of martensite), even though, as indicated above, the metallic structure may not be truly pearlitic. In a more general sense, it appears that effective results can be had where at least several minutes are occupied in bringing the kiln product down from a temperature which may be as high as 2100° F. to a temperature of 1170° F. to 1100° F., without sudden drop during the course of change from about 1400° F. to below 1200° F.

Although the entire cooling operation can conceivably be slower than quench-cooling over the entire drop (to about 200° F.), a special feature of the invention resides in the two-stage process described. While it appears that the material can be quench-cooled as soon as it reaches about 1170° F. and while ordinarily some special economy of operation is attainable by transferring the product to the quench tank 32 when it gets no lower than, say, 1000° F. to 900° F., it is found that substantial advantage of the invention is nevertheless obtained where the material reaches a substantially lower value in the rotary cooler, e.g. even down to 300° F., as where variations in production rate may sometimes (by longer time in the cooler or otherwise) permit or require reaching this temperature before quenching.

It will be noted, of course, that in all instances the first or earlier cooling stages (as also the quenching stage, inherently) are effected under non-oxidizing conditions. Although such conditions may involve the provision of additional inert or reducing gas, the system of Fig. 1 effectively achieves them, simply by communication of the cooler with the interior of the kiln structure 10–14, the atmosphere in the latter being essentially non-oxidizing, at least at substantially all points remote from the inlet end 12, from which waste gases are discharged through a stack, not shown.

As one example of operation, with a kiln of the character and dimensions described above and with a rotary cooler having a diameter of 6 feet and length between the seals 20, 22, of 40 feet, the feed to the kiln comprised 554 tons (dry basis) of magnetite ore containing 67.49% iron, such representing an input of 374 tons of iron. With an input total of 410 tons of coke, and a minor content of limestone as for the purpose indicated above, the kiln was operated, employing a slow but continuous feed of the materials, over a time of 8 days required to handle the total quantity stated. The material averaged about 12 hours in passing through the kiln, temperatures and conditions being regulated, as will readily be appreciated, to achieve high metallization, including temperatures through at least a major part of the kiln in the range of 1900° to 2100° F., with the kiln product discharged at about 2000° F. to 2100° F. The product from the described run contained a total of 379 tons of iron, metallic and combined (including iron picked up from or contained in the coke and other material), and showed an average metallization of 93.56%, or a total metallic iron content of about 355 tons. In one 24 hour period of the run, the average metallization was 96.7%.

The kiln discharge was slowly but continuously carried through the rotary cooler 18, which traveled through an external water bath as shown, and which delivered the material through the conduit 24 at a temperature well below 500° F. In the water quench tank it was further and substantially instantaneously reduced to a temperature of about 90° F. and was thereafter concentrated to yield a final iron product consisting of 93.5% metallic iron, on the average. The ground and thus finely divided product was satisfactorily briquetted, yielding coherent briquettes of high strength, well above the standards indicated above. The operation of the cooler 18 was such as to reduce the temperature of the kiln discharge material at an average of about 100° F. per minute.

In another test of the invention, using other equipment, of test size, but involving similar operations, an ore consisting of pre-formed taconite pellets, crushed and mixed with coke breeze (in the proportion of 20 parts by weight of the taconite to 8½ parts of coke) was reduced in a furnace at a temperature of 1970° F., for 2½ hours. The charge was then cooled down to 1100° F. in an atmosphere of nitrogen (at a cooling rate of less than 200° per minute) and was thereafter quenched in water. Upon grinding and concentration with the aid of magnetic separation, an iron product was obtained which briquetted quite satisfactorily, the briquettes showing a green strength of 1650 pounds per square inch under the standard test conditions stated above. The combined carbon content of the reduced iron was 0.81%, the metal structure appearing to be completely pearlitic.

For comparison, a similar run was made, using like quantities of the same materials, where there was no slow cooling, the charge being immediately quenched in water from a temperature of 1970° F. In this instance the green strength (on the above test) of briquettes was only 100 pounds per square inch, the combined carbon being 0.64% and the structure being clearly martensitic.

As further illustrating the applicability of the procedure to a wide variety of iron ores (including ores ranging upward from an iron content as low as 20% to 30%), a run was made with a hematite ore, 15 parts by weight, coke breeze 12 parts by weight and dolomitic limestone, 0.3 part. In this case the charge was kept at 1800° F. or above, for a period of 7½ hours in the furnace, and then was cooled under nitrogen to 1100° F. as in the run using taconite. The material was then quenched in water to a non-oxidizing temperature. After grinding and separating, the metal powder showed a green strength of 1500 pounds per square inch for briquettes, with a combined carbon content of 1.19% and with a fully pearlitic structure. In contrast, a run utilizing 17.4 parts by weight of manganiferous, Labrador hematite, 13.9 parts by weight of coke breeze and 0.4 part of dolomitic limestone, was made essentially as in the last example, but at a temperature of 1900° F. for a furnace time of about 7 hours. The furnace product was quenched from 1900° F. in water. After grinding and separating, the final iron material showed a green strength of essentially zero in that substantially coherent briquettes could not be made. The combined carbon was 0.92%, the structure being clearly martensitic.

The effectiveness of the present procedure in providing a high briquette strength for the iron product and avoiding briquetting difficulties as in the comparative tests above with simple quenching, has been abundantly demonstrated by these and other tests. The curves shown in Figs. 3 and 4, especially the latter, illustrate the improvement in a graphic manner, it being understood, of course, that as smooth lines, these curves represent an approximation or average of actual test values, which may depart individually to some extent (as usual in experimental work) from points precisely on the curves.

It will be appreciated that, in general, quenching means a relatively sudden cooling operation where a desired temperature drop of a material is produced essentially or nearly instantaneously by exposing the material to a body of non-oxidizing fluid. Although in some cases such fluid may conceivably be a large flow of a cold, non-oxidizing gas, special or unusual advantage appears to be served in the present process by liquid quenching, as by dumping the material into a body of liquid, or by using streams or showers of liquid. The liquid may be, for example, oil or other suitable liquid hydrocarbon, or very preferably water as described above. Indeed liquid contact cooling, especially by delivering the material beneath the surface of the liquid, has considerable special value as the final stage in the present process (as mentioned hereinabove) even where the temperature reduction may be somewhat slower than instantaneous.

High-strength, pressure-compacted, coherent briquettes of iron material produced by the present process and containing from 90% upwards of iron particles that have an average content of more than 0.2% combined carbon appear to constitute a new product of special utility, as explained above. Such briquettes are made from the final iron concentrate by compacting it under high pressure, e.g. of 35 tons per square inch and above; they are substantially free of binding agents, being cohered throughout by the mutual adherence of the iron particles. The finely divided material of which the briquette is constituted, i.e. the iron product derived by grinding and concentrating the material resulting from the reducing and cooling steps described above, may be considered to comprise from 90% to 99.4% of particles of metallic iron, substantially free of martensite, 0.5% to 5% of iron oxide material, and 0.1% to 5% of impurity material, and to have a capability of coherence satisfying the test described above, very preferably in resistance to a fibre stress of at least 1500 pounds per square inch. The briquettes have a density in the range of 310 to 365 pounds per cubic foot, preferably at or near the higher value, which is distinguishably less than the density of iron solidified from molten form. Thus the briquettes or other compacted forms of finely divided material possess density, heat and electrical properties very favorable to melting techniques.

It is to be understood that the invention is not limited to the specific embodiments herein set forth, but may be carried out in other ways without departure from its spirit.

We claim:

1. In the process of producing iron in the form of briquettes capable of being further treated to produce steel in an open hearth furnace, the steps of reducing an iron ore having a substantial gangue content in a reducing zone, constituted by a rotary kiln, by supplying the ore intermixed with a carbonaceous reducing material into said kiln and passing the ore and carbonaceous material therethrough, while maintaining temperatures within said kiln insufficient to melt the iron material, but at least about 1700° F. and thereby carrying out all the reducing action of said process; passing the reduced iron material from said reducing zone to a cooling zone, which is in open communication with the inside of said reducing zone, but is out of contact with the atmosphere, and has its atmosphere maintained non-oxidizing solely by its open communication with said reducing zone; abstracting heat from the iron material in said cooling zone, so as to cool it through a temperature range including the range from about 1350° F. down to a temperature below about 1200° F. at a rate of not more than about 200° F. per minute, so as to prevent the transition of any substantial proportion of the iron present to a martensite form; thereafter further cooling it out of contact with air to a temperature sufficiently low to avoid appreciable atmosphere oxidation; comminuting the cooled product and separating the comminuted material into at least one fraction containing a maximum practicable amount of the reduced iron present and at least one other fraction containing most of the gangue originally contained in the ore aforesaid; and compacting said iron-containing fraction to form briquettes therefrom without adding thereto any substantial amount of any agglomerating material, the briquettes so formed having a green strength of at least about 1000 pounds per square inch.

2. The process of producing iron in the form of briquettes in accordance with claim 1, in which the step of abstracting heat from the iron material in said cooling zone is effected by exposing the exterior of the vessel comprising said cooling zone to a cooling liquid; and in which the step of further cooling the solid material out of contact with air to a temperature sufficiently low to avoid appreciable atmospheric oxidation is effected by quenching the solid material in an aqueous liquid.

References Cited in the file of this patent

UNITED STATES PATENTS

| | | |
|---|---|---|
| 981,280 | Jones | Jan. 10, 1911 |
| 1,777,993 | Coley | Oct. 7, 1930 |
| 2,014,873 | Wildman | Sept. 17, 1935 |
| 2,296,522 | Hartley | Sept. 22, 1942 |
| 2,384,971 | Silvacy et al. | Sept. 18, 1945 |
| 2,557,651 | Gilliland | June 19, 1951 |
| 2,620,555 | Lenz | Dec. 9, 1952 |
| 2,663,632 | Oppegaard | Dec. 22, 1953 |
| 2,818,633 | Hoyer | Jan. 7, 1958 |